(12) United States Patent
Wang et al.

(10) Patent No.: US 6,208,073 B1
(45) Date of Patent: Mar. 27, 2001

(54) SMART LIGHT EMITTING DIODE CLUSTER AND SYSTEM

(75) Inventors: Hung-Tung Wang, Hsinchu; Shun-Chih Chen, Chia-Yi Hsien; Chih-Yuan Yen, Hsinchu; Chun-Fang Hsiao, Hsinchu Hsien; Fang-Shih Chuang; Chien-Chen Hung, both of Hsinchu, all of (TW)

(73) Assignee: Opto Tech Corp., Hsinchu (TW)

( * ) Notice: Subject to any disclaimer, the term of this patent is extended or adjusted under 35 U.S.C. 154(b) by 0 days.

(21) Appl. No.: 09/153,113

(22) Filed: Sep. 15, 1998

(51) Int. Cl.[7] ............................................ H01J 1/62

(52) U.S. Cl. ................................. 313/500; 362/800

(58) Field of Search ..................... 313/500, 51; 257/88; 362/800; 340/782; 345/84, 39, 40, 44, 46; 315/185 R, 361

(56) References Cited

U.S. PATENT DOCUMENTS 5,036,248 * 7/1991 McEwan et al. .................... 313/500

* cited by examiner

Primary Examiner—Michael H. Day
Assistant Examiner—Todd Reed Hopper

(57) ABSTRACT

A smart light emitting diode cluster and system includes a central processing unit (CPU) and a plurality of LED cluster strings, each comprising a plurality of LED cluster connected in series. Each LED cluster includes an LED drive circuit and a plurality of LEDs. The CPU receives external input image signal, and then desired control signal and image data are sent to the LED cluster strings by appropriate processing. The control signal is used to switch the LEDs in the cluster to generate desired image and related color variation. The control signal and image data are transferred to the next LED cluster by the present LED drive circuit. In this manner, the control signal and image data are progressively transferred from the first to the last cluster so that a whole image with color variation can be displayed by all the LEDs in the system.

10 Claims, 4 Drawing Sheets

SMART LIGHT EMITTING DIODE CLUSTER AND SYSTEM

FIELD OF THE INVENTION

The present invention relates to a smart LED cluster and system, and more particularly, to an LED cluster and system without a drive circuit board and module controller so as to simplify the whole structure, save the space, increase operation stability, and achieve easy maintenance.

BACKGROUND OF THE INVENTION

LED is a light emitting device, which is operated in forward conduction to transform the electric energy into nearly monochromic light with narrow wave length profile in visible light region by recombination of holes and electrons. An LED has lower power consumption than that of a typical lamp or glowing lamp as well as a longer life. At present, there are LEDs with various colors, which have been manufactured and can be used to show color images. Moreover, because of high brightness, stable color tone, and high switch speed faster than that of human eyes, the LEDs can display a color image with progressive change and are widely used as dynamic image display devices or to construct large display panels.

With reference to FIG. 1, a conventional LED cluster system includes a CPU 10, a plurality of module controllers 20, a plurality of drive circuit boards 30, and a plurality of LED cluster strings 40. Each LED cluster string 40 includes a plurality of LED clusters 50, each comprising various number of LEDs 60 with specific colors and an outer case 70, as shown in FIG. 2. A plurality of LEDs 60 are located on a base 80. The input signal from the drive circuit boards 30 is sent to the base 80 by conducting wires 90, and then provided to each LED 60. The other space within the outer case 70 is filled with suitable filler 92, such as epoxyresin, to form an effective insulation structure to protect the internal connected wires for long term use outdoors against damage due to sunlight and rain.

The image signal including VGA/SVGA or other format of images from RS232 or other transmission interface is received and then appropriately processed by the CPU 10. The resultant data are transmitted to module controllers 20, each controlling the corresponding drive circuit board 30. The drive circuit boards 30 are connected in series so that the first stage drive circuit board will pass the suitable signal to the next stage, and in such a manner the last stage will receive the desired signal from its previous stage. Each drive circuit board 30 is used to drive the corresponding LED cluster string 40. The LED clusters 50 in the LED cluster string 40 are generally arranged in a matrix on a plane to form a rectangular display unit, and further several such rectangular display units may construct a large LED display with a specific shape.

The above LED cluster system needs a discrete drive circuit board 30 to switch all the LEDs in the LED cluster string 40 so that the whole structure becomes complicated and occupies larger space. For a large display device, it is inconvenient that more devices are needed and repair frequency is increased to decrease the working hour and the whole system efficiency.

Therefore, an LED cluster system with easy maintenance and fewer devices as well as improved characteristics is highly desirable.

SUMMARY OF THE INVENTION

One object of the present invention is to provide a smart LED cluster, which includes a control circuit board with small size so as to integrate a conventional module controller and a drive circuit board into the control circuit board. Several LEDs are located in the cluster so that the cluster has a function of switching individual LEDs to save the space, material, and manufacturing cost for the module controller and drive circuit board. Furthermore, the control circuit board is filled with epoxy resin to increase the life and reliability against outdoor environment.

Another object of the present invention is to provide a smart LED cluster system, having a plurality of smart LED clusters with the primary function of a conventional module controller and a drive circuit board. The smart LED cluster system includes a plurality of LED cluster strings connected in parallel to the CPU in the system, each cluster string having a plurality of LED clusters connected in series. A first stage LED cluster in the LED cluster string receives the signal and data from the CPU and then transmits to a next stage LED cluster, and the process continues until the last stage LED cluster receives the signal and data. The whole structure of the system is simple, easy to maintain, and has high reliability because only two kinds of devices are needed, including the CPU and a plurality of LED cluster strings.

Other features and advantages of the invention will become apparent from the following description of the invention which refers to the accompanying drawings.

DETAILED DESCRIPTION OF THE PREFERRED EMBODIMENTS

Figure 1:
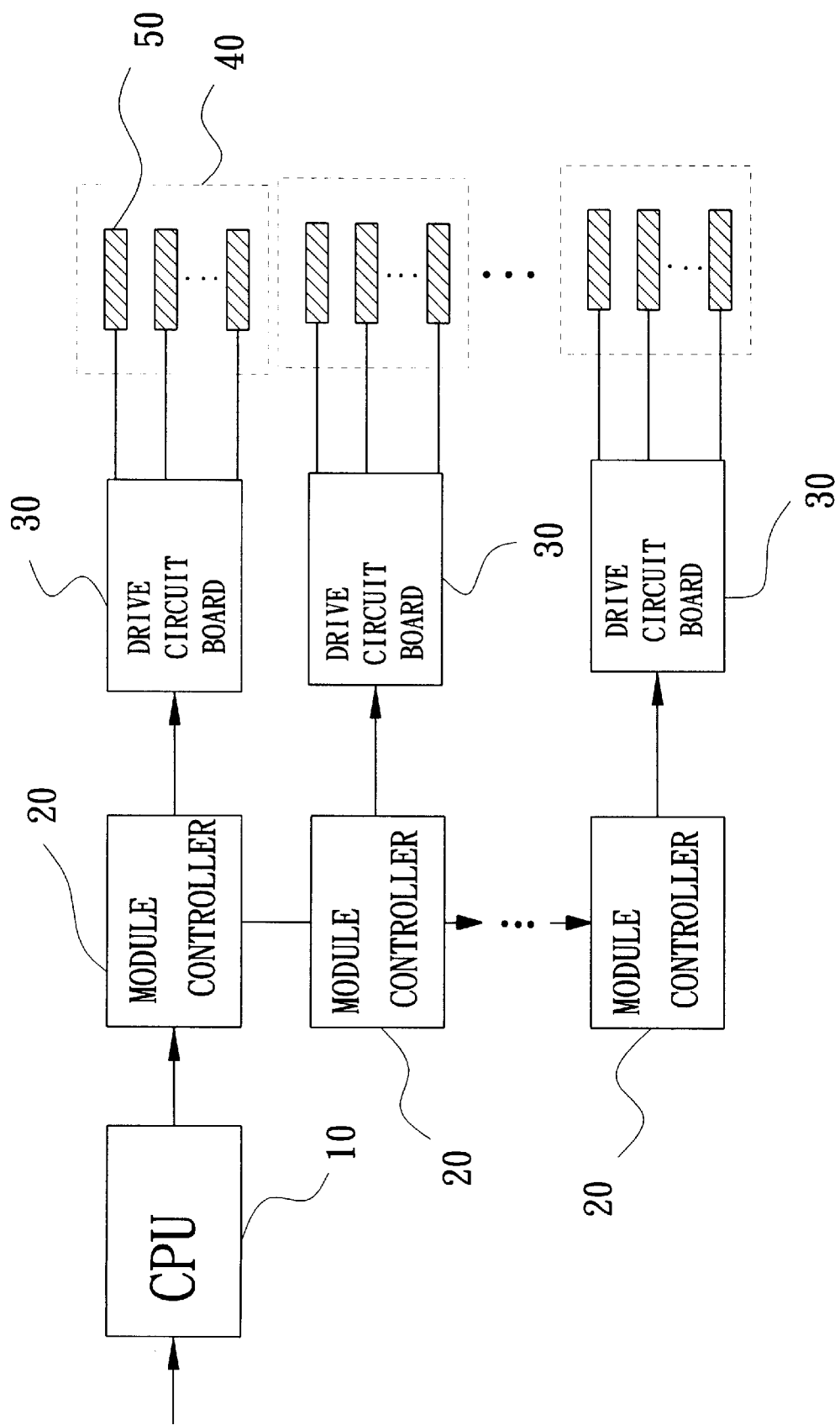
FIG. 1 shows a schematic diagram of an LED cluster system in the prior arts.
Figure 2:
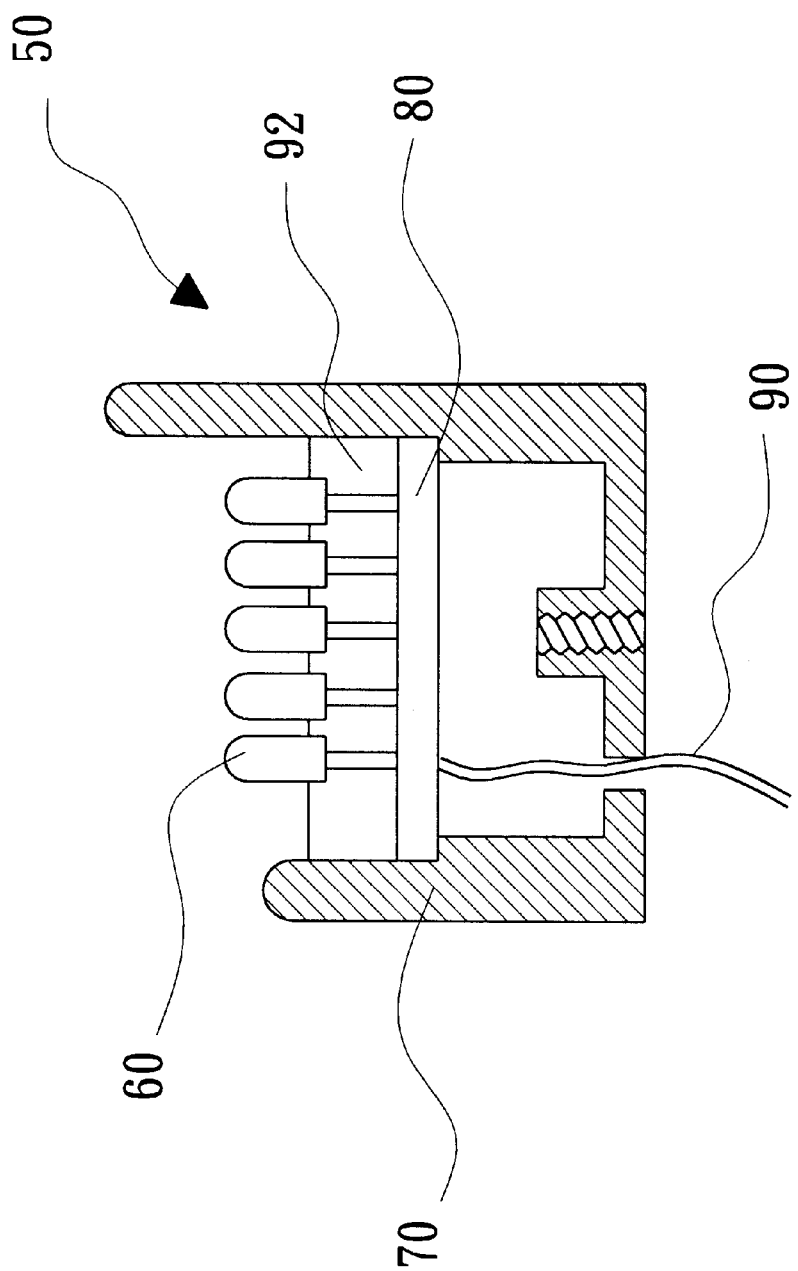
FIG. 2 shows a schematic diagram of an LED cluster in the prior arts.
Figure 3:
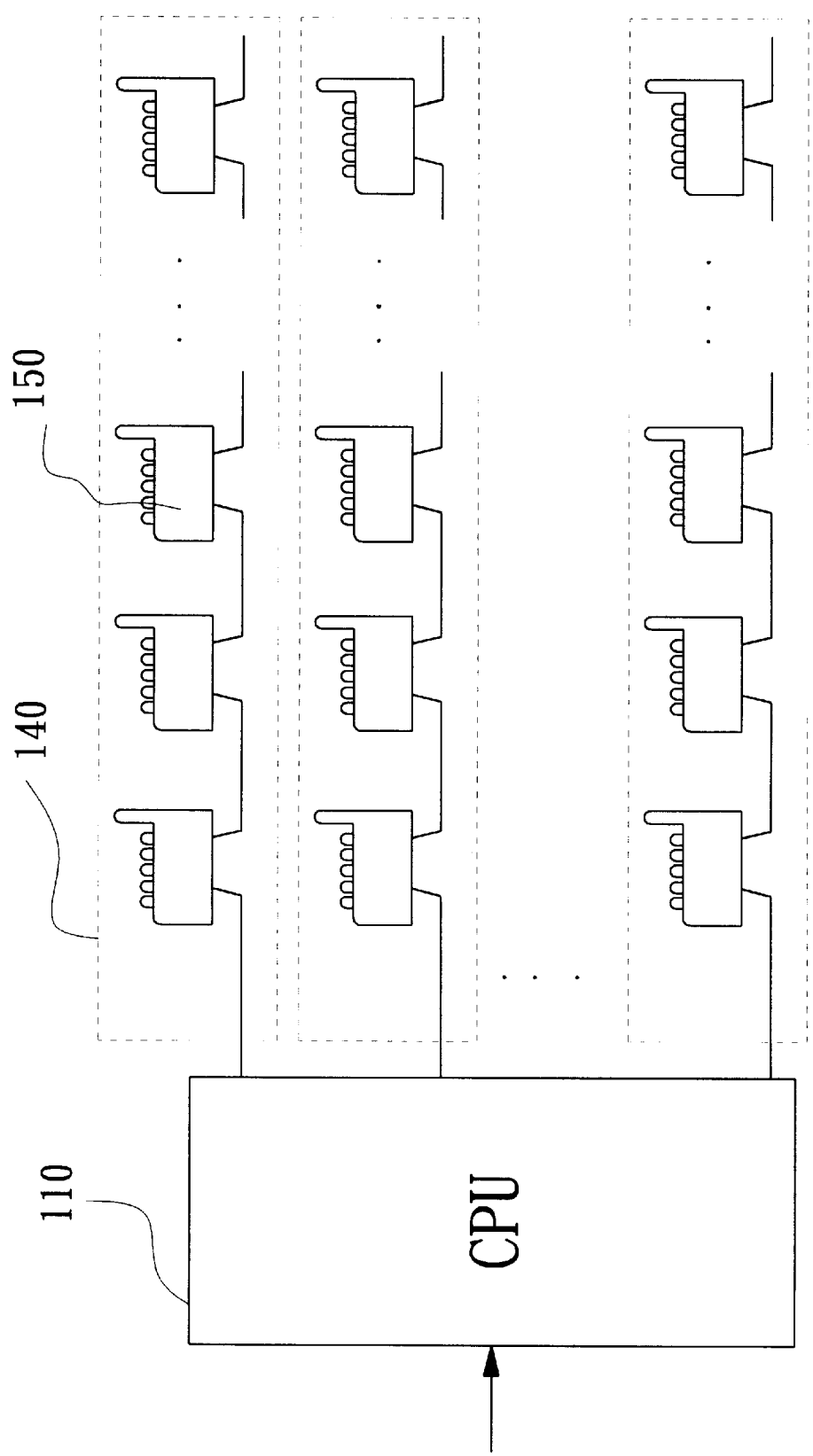
FIG. 3 shows a schematic diagram of the LED cluster system in accordance with the present invention.
Figure 4:
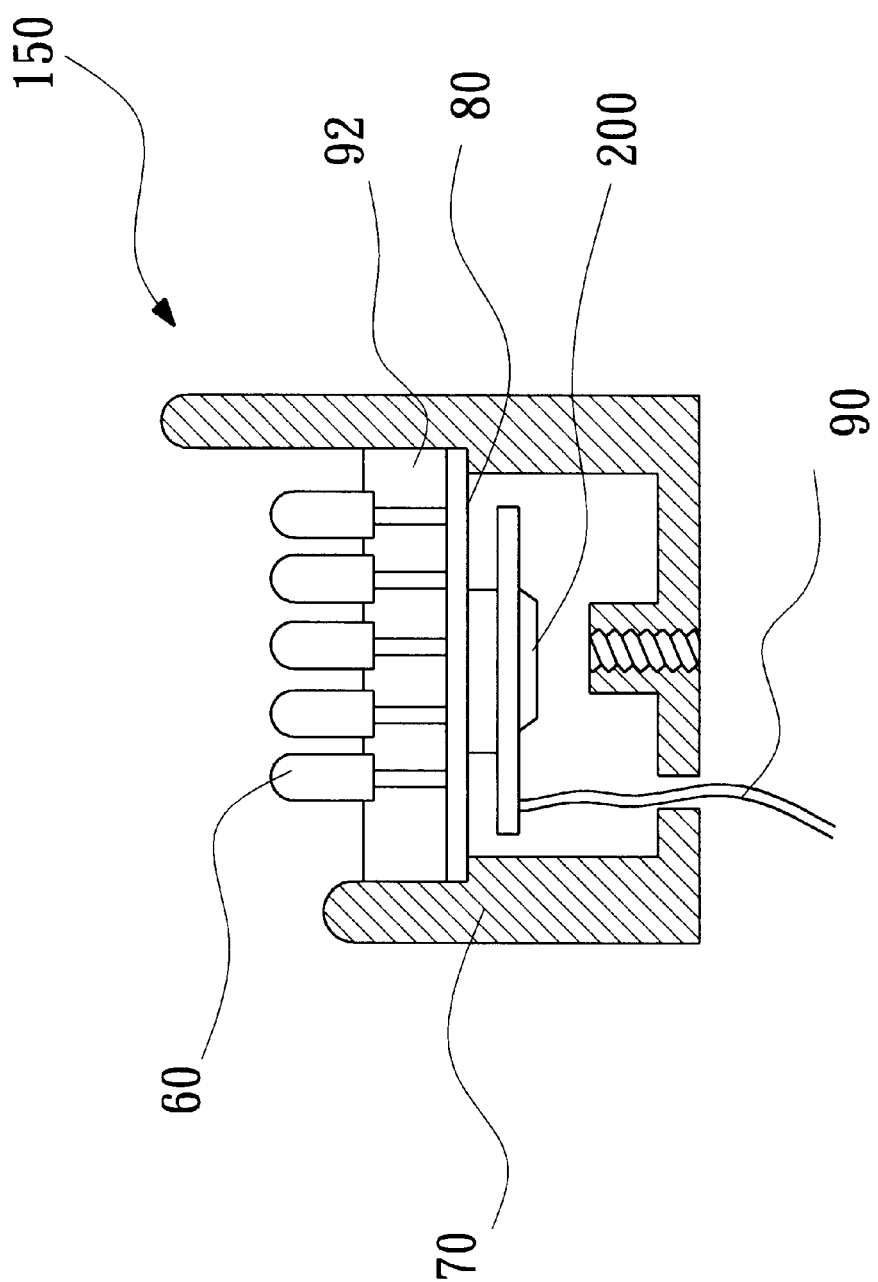
FIG. 4 shows a schematic diagram of the LED cluster in accordance with the present invention.

With reference to FIG. 3, the LED cluster system of the present invention includes a CPU 110 and a plurality of LED cluster strings 140 which are connected in parallel to the CPU 110 for receiving the output signal and data from the CPU 110. Each LED cluster string 140 is composed of a plurality of LED clusters 150. FIG. 4 illustrates the schematic diagram of the LED cluster 150 in accordance with the present invention, which comprises various number of LEDs 60 with various colors, a base 80, a control circuit board 200, and an outer case 70. LEDs 60 are located on the base 80, and the control circuit board 200 is placed under the base 80. The external input signal is transferred to the corresponding LED 60 by the connecting wires. The LED may be a typical LED, a chip LED, or a chip LED directly fixed in chip-on-board. Other space within the outer case 70 is filled with suitable filler 92 such as epoxy resin, silicone, or other water-proof material to form an effective insulation structure to protect the internal connected wires.

The primary function of the conventional module controller and the drive circuit board is integrated into the small control circuit board 200 of the LED cluster 150 in accordance with the present invention so that the LED cluster 150 has a function of switching all the LEDs 60 in the LED cluster 150 to save the space for the module controller and the drive circuit board, the material, and the manufacturing cost.

All the LED clusters 150 in the LED cluster string 140 are connected in series, wherein the first stage drive circuit is connected to the CPU 110 to receive the desired signal and data. The first stage will pass the suitable signal and data to the next stage, and in such a manner the last stage will receive the desired signal from its previous stage. The whole structure of the system is simple, easy to maintain, and has high reliability because only two kinds of devices are needed, including the CPU and a plurality of LED cluster strings.

According to the present invention, the control circuit board of each LED cluster provides the function of the conventional module controller and the drive circuit board. In the LED cluster string, the LED clusters are connected in series. The control circuit board at each stage receives signal and data from its previous cluster and passes suitable signal and data to the next cluster based on appropriate decision and process for received data. The appropriate decision determines if the received data are to be transmitted or held. The appropriate process is to transform the received signal to an LED driving signal to drive the LEDs in the cluster.

Although only the preferred embodiments of this invention were shown and described in the above description, it is requested that any modification or combination that comes within the spirit of this invention be protected.

What is claimed is:

1. A light emitting diode (LED) cluster, comprising:
   a base;
   a plurality of LEDs located on said base;
   a control circuit board located under said base; and
   an outer case enclosing said base, said LEDs, and said control circuit board, and filled with suitable filler as effective insulator to protect said control circuit board and related connecting wires;
   wherein an external input signal is transmitted to said plurality of LEDs through said base by conductive wires, and said control circuit board drives said plurality of LEDs by transmitting a resultant signal obtained from appropriate decision and process for received data through said conductive wires, said appropriate decision determining that said received data are transmitted or held.

2. A light emitting diode cluster as claimed in claim 1, wherein said suitable filler is epoxy resin, silicone rubber, or other water-proof material.

3. A light emitting diode cluster as claimed in claim 1, wherein said LEDs are typical LEDs, chip LEDs, or chip LEDs directly fixed on a circuit board.

4. A light emitting diode cluster as claimed in claim 1, wherein said appropriate process for said received data is to transform said external input signal into an LED driving signal to drive said plurality of LEDs.

5. A light emitting diode cluster system, comprising:
   a central processing unit (CPU); and
   a plurality of LED cluster strings being connected in parallel to said CPU and receiving control signal and data from said CPU, each LED cluster string having a plurality of LED clusters connected in series;
   wherein each LED cluster comprises:
   a base;
   a plurality of LEDs located on said base and arranged in several groups each having various number of LEDs and a specific color;
   a control circuit board located under said base; and
   an outer case enclosing said base, said LEDs, and said control circuit board, and filled with suitable filler as effective insulator to protect said control circuit board and related connecting wires;
   wherein an external input signal is transmitted to said plurality of LEDs through said base by conductive wires.

6. A light emitting diode cluster system as claimed in claim 5, wherein said suitable filler is epoxy resin, silicone rubber, or other water-proof material.

7. A light emitting diode cluster as claimed in claim 5, wherein said LEDs are typical LEDs, chip LEDs, or chip LEDs directly fixed on a circuit board.

8. A light emitting diode cluster system as claimed in claim 5, wherein said control circuit board drives said plurality of LEDs by transmitting a resultant signal to a corresponding control circuit board in a next cluster, said resultant signal being obtained from appropriate decision and process for received data through said conductive wires.

9. A light emitting diode cluster system as claimed in claim 8, wherein said appropriate decision for said received data is to determine that said received data are transmitted or held.

10. A light emitting diode cluster system as claimed in claim 8, wherein said appropriate process for said received data is to transform said external input signal into an LED driving signal to drive said plurality of LEDs.

* * * * *